United States Patent
Miyata

(10) Patent No.: US 9,298,073 B2
(45) Date of Patent: Mar. 29, 2016

(54) PROJECTOR AND METHOD FOR CONTROLLING PROJECTOR

(71) Applicant: SEIKO EPSON CORPORATION, Tokyo (JP)

(72) Inventor: Takahiro Miyata, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 176 days.

(21) Appl. No.: 14/053,934

(22) Filed: Oct. 15, 2013

(65) Prior Publication Data

US 2014/0111777 A1   Apr. 24, 2014

(30) Foreign Application Priority Data

Oct. 19, 2012   (JP) .................................. 2012-231900

(51) Int. Cl.
| G03B 21/16 | (2006.01) |
| F21V 29/02 | (2006.01) |
| F21V 29/00 | (2015.01) |
| F21V 29/60 | (2015.01) |
| H04N 9/31  | (2006.01) |

(52) U.S. Cl.
CPC ............... *G03B 21/16* (2013.01); *F21V 29/02* (2013.01); *F21V 29/20* (2013.01); *F21V 29/60* (2015.01); *H04N 9/3144* (2013.01); *H04N 9/3155* (2013.01)

(58) Field of Classification Search
CPC ......... G03B 21/16; F21V 29/20; F21V 29/60; F21V 29/02

USPC .................... 353/57, 58, 60, 61; 362/373
See application file for complete search history.

(56) References Cited

U.S. PATENT DOCUMENTS

| 7,018,049 | B2* | 3/2006 | Wu et al. | 353/58 |
| 7,040,762 | B2* | 5/2006 | Yasuda | 353/52 |
| 7,258,446 | B2* | 8/2007 | Jayaram et al. | 353/52 |
| 7,839,636 | B2* | 11/2010 | Hiroi | 361/695 |
| 7,891,820 | B2* | 2/2011 | Hsiao et al. | 353/57 |
| 2007/0285623 | A1* | 12/2007 | Kuraie | 353/58 |
| 2008/0030689 | A1* | 2/2008 | Hsu | 353/57 |
| 2010/0079731 | A1* | 4/2010 | Okada | 353/58 |
| 2012/0002175 | A1* | 1/2012 | Fujiwara | 353/52 |

FOREIGN PATENT DOCUMENTS

| JP | A-2003-5289 | 1/2003 |
| JP | A-2010-176053 | 8/2010 |
| JP | A-2010-178134 | 8/2010 |

\* cited by examiner

*Primary Examiner* — William C Dowling
(74) *Attorney, Agent, or Firm* — Oliff PLC

(57) ABSTRACT

A projector includes an optical part including a light source section that outputs light, a light modulator that modulates the light outputted from the light source section based on an image signal, a projection optical section that projects the modulated light from the light modulator, a first fan that cools the optical part, and a fan controller that controls the first fan, and the fan controller operates the first fan intermittently when the light source section outputs light of luminance lower than luminance corresponding to normal image display.

14 Claims, 7 Drawing Sheets

PROJECTOR AND METHOD FOR CONTROLLING PROJECTOR

BACKGROUND

1. Technical Field

The present invention relates to a projector and a method for controlling the projector.

2. Related Art

Conventionally, a projector includes an exhaust fan for exhausting air in an enclosure of the projector. The reason for this is that an increase in temperature in the enclosure due to use of a high-intensity lamp lowers the performance of optical parts that form a liquid crystal panel, a polarization conversion system, a color separation/light combining system, and other optical systems. For example, JP-A-2003-5289 discloses a projector that includes an exhaust fan and an intake fan and controls the rotational speeds of the exhaust fan and the intake fan in accordance with the temperature of sucked outside air detected with a temperature sensor.

In recent years, power consumption of projectors has been continuously reduced. To this end, a projector having what is called a power saving mode is provided. In the power saving mode, electric power supplied to a lamp when no image is displayed is reduced to about 20% to 30% of rated power. When the projector is operated in the power saving mode, the luminance of the lamp decreases and the temperature of the lamp becomes lower than that in normal operation. The lamp is therefore overcooled in some cases if a cooling fan is driven at the same number of revolutions as that in the normal operation. In this case, vapor in the lamp condenses, resulting in a problem of a decrease in reliability of the lamp.

To avoid the problem, it is preferable to sufficiently lower the number of revolutions of the cooling fan when the projector is operated in the power saving mode. The reason for this is that completely stopping the cooling fan is not preferable because the temperatures of a variety of optical parts increase and performance and reliability thereof may not be ensured. In general, however, the specifications of a cooling fan are determined based on cooling capability at high temperatures (usable limit of cooling fan running at high rotational speed). When a designer of the projector determines the specifications of the cooling fan in consideration of the cooling capability at high temperatures, a usable limit of the cooling fan running at a low rotational speed is determined automatically. The designer is therefore not free to set the specifications of the cooling fan running at a low rotational speed. It is therefore difficult for the designer to set the number of revolutions of the cooling fan running at a low rotational speed in such a way that both the reliability of the lamp or any other light source section and the performance and reliability of a variety of optical parts are ensured.

SUMMARY

An advantage of some aspects of the invention is to provide a projector that can satisfy both the reliability of a light source section and the performance and reliability of a variety of optical parts.

A projector according to an aspect of the invention includes an optical part including a light source section that outputs light, a light modulator that modulates the light outputted from the light source section based on an image signal, a projection optical section that projects the modulated light from the light modulator, a first fan that cools the optical part, and a fan controller that controls the first fan, and the fan controller operates the first fan intermittently when the light source section outputs light of luminance lower than luminance corresponding to normal image display.

A method for controlling a projector according to another aspect of the invention is a method for controlling a projector that projects an image and includes an optical part including a light source section that outputs light and a first fan that cools the optical part, the method including causing the light source section to output light of luminance lower than luminance corresponding to normal display of the image and operating the first fan intermittently.

According to the configuration described above, the fan controller operates the first fan intermittently when the light source section outputs light of luminance lower than luminance corresponding to normal image display. The optical part is therefore cooled by the first fan by the same degree as in a case where the first fan is operated at a smaller number of revolutions than that in the normal image display. Even when it is difficult to operate the first fan at a small number of revolutions, optimizing the timings at which the first fan starts and stops rotating in the intermittent operation allows temperature control to be so made that the temperature of the light source section will not be too low and the temperature of the optical part other than the light source section will not be too high. A projector in which both the reliability of the light source section and the performance and reliability of a variety of optical parts are satisfied is thus achieved.

The projector according to the aspect of the invention may be configured such that the projector further includes a second fan that cools the light source section, and the fan controller stops the second fan when the light source section outputs light of luminance lower than luminance corresponding to the normal image display.

According to the configuration described above, the light source section is reliably cooled by the second fan operated in the normal image display. On the other hand, when the light source section outputs light of luminance lower than the luminance corresponding to the normal image display, stopping the second fan can reliably prevent the light source section from being overcooled, whereby the reliability of the light source section can be further improved.

The projector according to the aspect of the invention may be configured such that a situation in which the light source section outputs light of luminance lower than luminance corresponding to the normal image display corresponds to a low electric power mode in which electric power supplied to the light source section is lower than electric power supplied in the normal display.

According to the configuration described above, the luminance of the light source section lowers in the low electric power mode, in which the electric power supplied to the light source section is lower than the electric power supplied in the normal image display, whereby the reliability of the light modulator can be improved and the projector consumes a reduced amount of electric power.

The projector according to the aspect of the invention may be configured such that the situation in which the light source section outputs light of luminance lower than luminance corresponding to the normal image display corresponds to an operation mode in which the light modulator displays no image thereon.

According to the configuration described above, the amount of electric power supplied to the light source section is reduced and hence the luminance of the light source section lowers in the operation mode in which the light modulator displays no image thereon, whereby the reliability of the light modulator can be improved.

The projector according to the aspect of the invention may be configured such that the projector further includes a first temperature sensor that detects the temperature of the light source section and a second temperature sensor that detects the temperature of the optical part other than the light source section, and the fan controller activates the first fan when the temperature detected with the second temperature sensor is higher than or equal to an upper limit region of an acceptable temperature range of the optical part other than the light source section, and deactivates the first fan when the temperature detected with the first temperature sensor is lower than or equal to a lower limit region of an acceptable temperature range of the light source section.

According to the configuration described above, the first temperature sensor detects the temperature of the light source section, and the second temperature sensor detects the temperature of the optical part other than the light source section. Since the first fan is activated when the detected temperature from the second temperature sensor is higher than or equal to the upper limit region of the acceptable temperature range of the optical part other than the light source section, accurate temperature control can be so performed that the temperature of the optical part does not become higher than the upper limit of the acceptable temperature range. Further, since the first fan is deactivated when the detected temperature from the first temperature sensor is lower than or equal to the lower limit region of the acceptable temperature range of the light source section, accurate temperature control can be so performed that the temperature of the light source section does not become lower than the lower limit of the acceptable temperature range.

The projector according to the aspect of the invention may be configured such that a single temperature sensor serves as the first temperature sensor and the second temperature sensor.

According to the configuration described above, the number of temperature sensors and hence the number of parts can be reduced.

The projector according to the aspect of the invention may be configured such that the fan controller operates the first fan intermittently based on a switching program according to which the operation of the first fan is switched.

According to the configuration described above, the first fan can be operated intermittently based on an operation switching setting provided in advance. Since the projector performs no temperature detection in this case, no temperature sensor is required. Even when the projector includes a temperature sensor, the control of the first fan does not require a temperature detection result from the temperature sensor.

The projector according to the aspect of the invention may be configured such that the number of revolutions of the intermittently operated first fan is lower than the number of revolutions of the first fan operated when the normal image display is performed.

According to the configuration described above, the range of the number of revolutions is smaller than the range in a case where the intermittent operation is performed by using the number of revolutions of the first fan operated when the normal image display is performed. As a result, the temperatures change moderately, and the frequency of the switching between the activation and deactivation of the first fan can be lowered.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to FIGS. 1 to 4A and 4B.

A projector according to the present embodiment is an example of what is called a three-panel liquid crystal projector including three sets of liquid crystal light valves.

In the following drawings, each component is not drawn to scale in some cases for ease of illustration thereof.

Figure 1:
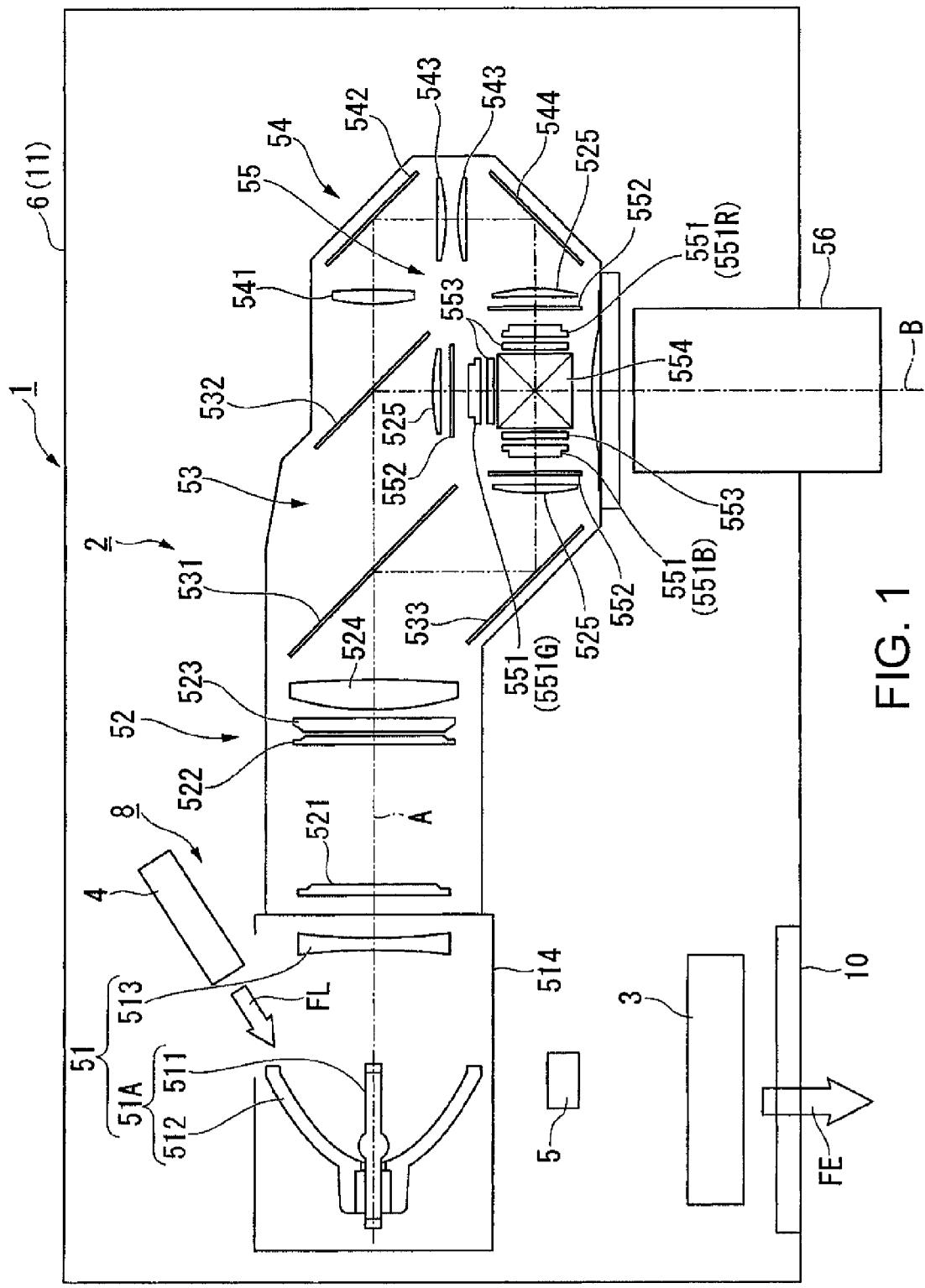
FIG. 1 is a plan view showing a schematic configuration of a projector according to a first embodiment.

A projector 1 according to the present embodiment includes an optical unit 2, an exhaust fan 3, a lamp fan 4, a temperature sensor 5, an enclosure 6, and a fan controller 7 (see FIG. 2), as shown in FIG. 1. The optical unit 2 includes an illuminator 8, a color separation optical section 53, a light modulator 55, a light combining optical section 554, and a projection optical section 56. The illuminator 8 is formed of a light source section 51 and a uniform illumination optical section 52.

The exhaust fan 3 in the present embodiment corresponds to a first fan in the appended claims. The lamp fan 4 in the present embodiment corresponds to a second fan in the appended claims.

The optical unit 2 will be described below.

The light source section 51 outputs light toward the uniform illumination optical section 52. The light source section 51 includes a light source section main body 51A, a parallelizing lens 513, and a housing member 514. The light source section main body 51A includes a lamp 511 and a reflector 512. The lamp 511, the reflector 512, and the parallelizing lens 513 are accommodated in the housing member 514. Reference character A in FIG. 1 denotes a central axis of light emitted from the lamp 511, and the central axis is referred to as an illumination optical axis in the following description.

The lamp 511 has a light emission center in the vicinity of a first focal point of the reflector 512. The lamp 511 includes an arc vessel and a pair of sealed portions. The pair of sealed portions extend from both sides of the arc vessel. The arc vessel is formed of a sphere made of quartz glass. The arc vessel includes a pair of electrodes disposed in the sphere and has mercury, a rare gas, and a small amount of halogen encapsulated in the sphere. The lamp 511 can, for example, be an ultrahigh-pressure mercury lamp, a high-pressure mercury lamp, or a metal halide lamp. The reflector 512 has a tubular neck-shaped portion and a reflection surface. One of the sealed portions of the lamp 511 is inserted into and fixed to the neck-shaped portion. The reflection surface reflects part of the light radiated from the lamp 511, that is, light traveling toward the reflector 512, toward a second focal point of the reflector 512.

The uniform illumination optical section 52 is an optical system that causes the light outputted from the light source section 51 to illuminate an image formation area of each liquid crystal light valve 551 in a substantially uniform manner. The uniform illumination optical section 52 includes a first lens array 521, a second lens array 522, a polarization conversion element 523, and a superimposing lens 524.

The first lens array 521 has a configuration in which a plurality of lenslets are arranged in a matrix formed of a plurality of rows and columns in a plane perpendicular to the illumination optical axis A. The first lens array 521 serves as a light flux dividing optical element that divides light having passed through the parallelizing lens 513 into a plurality of sub-light fluxes. Although not described with reference to the drawings, the outer shape of each of the lenslets is similar to the outer shape of the image formation area of each liquid crystal light valve 551.

The second lens array 522 has a configuration in which a plurality of lenslets are arranged in a matrix formed of a plurality of rows and columns in a plane perpendicular to the illumination optical axis A, as in the configuration of the first lens array 521. The second lens array 522 in conjunction with the superimposing lens 524 has a function of focusing images of the lenslets in the first lens array 521 in the vicinity of the image formation area of each liquid crystal light valve 551.

The polarization conversion element 523 converts the polarization directions of the divided sub-light fluxes from the first lens array 521 into an aligned polarization direction and outputs substantially one type of linearly polarized sub-light fluxes. The polarization conversion element 523 includes a polarization separation layer, a reflection layer, and a retardation plate. The polarization separation layer, which receives illumination light from the lamp 511, transmits one polarized light flux (P-polarized light flux, for example) and reflects another polarized light flux (S-polarized light flux, for example) in a direction perpendicular to the illumination optical axis A. The reflection layer reflects the light reflected off the polarization separation layer and having the other polarization component in the direction parallel to the illumination optical axis A. The retardation plate converts the light having passed through the polarization separation layer and having the one polarization component into light having the other polarization component.

The superimposing lens 524 is an optical element that collects the plurality of sub-light fluxes having passed through the first lens array 521, the second lens array 522, and the polarization conversion element 523 and superimposes the collected sub-light fluxes in the vicinity of the image formation area of each liquid crystal light valve 551. The superimposing lens 524 is so disposed that the optical axis of the superimposing lens 524 substantially coincides with the illumination optical axis A of the illuminator 8. The superimposing lens 524 may be a compound lens formed of a combination of a plurality of lenses.

The color separation optical section 53 includes a first dichroic mirror 531, a second dichroic mirror 532, and a reflection mirror 533. The first dichroic mirror 531 and the second dichroic mirror 532 have a function of separating the plurality of sub-light fluxes having exited out of the uniform illumination optical section 52 into red (R), green (G), and blue (B), three color light fluxes. The first dichroic mirror 531 transmits red light and green light and reflects blue light. The second dichroic mirror 532, which receives the light having passed through the first dichroic mirror 531, transmits the red light and reflects the green light.

The first dichroic mirror 531 separates the light incident thereon into red and green light and blue light. The blue light is then reflected off the reflection mirror 533 and guided to a liquid crystal light valve 551B for blue light. The second dichroic mirror 532 separates the light incident thereon into green light and red light. The green light is guided to a liquid crystal light valve 551G for green light. The color separation optical section 53 further includes a relay optical section 54, which includes a light-incident-side lens 541, relay lenses 543, a reflection mirror 542, and a reflection mirror 544. The relay optical section 54 has a function of guiding the red light separated by the color separation optical section 53 to a liquid crystal light valve 551R for red light while preventing loss of the red light, which travels along a longer optical path than the other color light fluxes. Each field lens 525 converts each of the sub-light fluxes having exited out of the second lens array 522 into a light flux parallel to the central axis (principal ray) of the sub-light flux.

The light modulator 55 includes three sets of liquid crystal light valves 551 (liquid crystal light valve 551R for red light, liquid crystal light valve 551G for green light, and liquid crystal light valve 551B for blue light) and a light-incident-side polarizer 552 and a light-exiting-side polarizer 553 disposed on the light incident side and the light exiting side of each of the liquid crystal light valves 551. The light modulator 55 modulates the light outputted from the illuminator 8 and incident on the light modulator 55 based on an image signal.

The light combining optical section 554 is formed of a cross dichroic prism. The light combining optical section 554 combines the modulated light fluxes from the liquid crystal light valves 551 for the three colors. The cross dichroic prism is an optical element that combines the color light fluxes to form a color image. The cross dichroic prism is formed by bonding four rectangular prisms and thus has a substantially square shape in a plan view. Dielectric multilayer films are formed on substantially X-shaped interfaces between the bonded rectangular prisms. The dielectric multilayer film formed on one of the substantially X-shaped interfaces reflects the blue light, whereas the dielectric multilayer film formed on the other interface reflects the red light. The dielectric multilayer films deflect the optical paths of the blue light and the red light, which then travel in the same direction as the green light. The three color light fluxes are thus combined.

The projection optical section 56 includes a plurality of projection lenses on which the combined light from the light combining optical section 554 is incident and a projection lens enclosure that accommodates the plurality of projection lenses.

The illumination optical axis A of the illuminator 8 and a projection optical axis B of the projection optical section 56 are perpendicular to each other, as shown in FIG. 1. The exhaust fan 3 is disposed in an area surrounded by the illuminator 8 and the projection optical section 56. The exhaust fan 3 is formed, for example, of a sirrocco fan. An exhaust port 10 is provided in a side surface of a lower case 11 in a sideways position with respect to the projection optical section 56, as shown in FIG. 1. The exhaust fan 3 exhausts high-temperature air in the enclosure 6 out thereof through the exhaust port 10. The arrow labeled with reference character FE shows the flow of heated air.

The lamp fan 4 is disposed in the vicinity of the uniform illumination optical section 52 and the first dichroic mirror 531, as shown in FIG. 1. The lamp fan 4 is formed, for example, of a sirrocco fan. The lamp fan 4 cools the light source section 51 including the lamp 511, for example, by introducing air outside the enclosure 6 and directing the air in the form of cooling air toward the light source section 51. The arrow labeled with reference character FL shows the flow of the cooling air.

The temperature sensor 5 is disposed between the light source section 51 and the exhaust fan 3, as shown in FIG. 1. The correlation between a detected temperature detected with the temperature sensor 5 and the temperatures of a variety of optical parts, such as the lamp 511 and the liquid crystal light valves 551, is determined in advance. The correlation data is stored, for example, in the form of a lookup table. The fan controller 7 in the projector 1 can derive the temperatures of the variety of optical parts, such as the lamp 511 and the liquid crystal light valves 551, based on a detected temperature from the temperature sensor 5 and the lookup table.

How to control the fans in the present embodiment will be described below.

Figure 2:
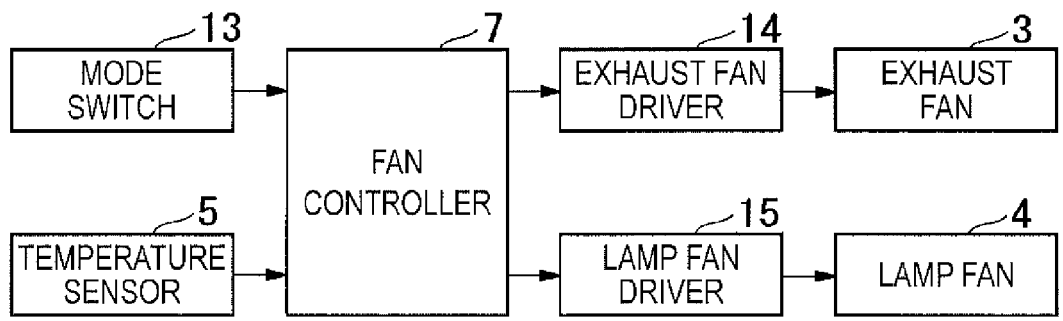
FIG. 2 is a block diagram showing the configuration of a fan control system in the projector according to the present embodiment.

The control of the fans involves the fan controller 7, a mode switch 13, the temperature sensor 5, an exhaust fan driver 14, a lamp fan driver 15, and other components, as shown in FIG. 2. The mode switch 13 outputs a mode signal, which will be described later, to the fan controller 7. The temperature sensor 5 outputs a temperature detection result to the fan controller 7. The fan controller 7 outputs an exhaust fan control signal to the exhaust fan driver 14. The fan controller 7 outputs a lamp fan control signal to the lamp fan driver 15.

The fan controller 7 controls the exhaust fan 3 and the lamp fan 4. The exhaust fan driver 14 receives the exhaust fan control signal from the fan controller 7 and generates a voltage supplied to the exhaust fan 3 to drive the exhaust fan 3. The exhaust fan driver 14 includes, for example, a voltage generator and an exhaust fan motor. The lamp fan driver 15 receives the lamp fan control signal from the fan controller 7 and generates a voltage supplied to the lamp fan 4 to drive the lamp fan 4. The lamp fan driver 15 includes, for example, a voltage generator and a lamp fan motor.

The projector 1 according to the present embodiment includes a plurality of fans as well as the exhaust fan 3 and the lamp fan 4. It is, however, noted that only the exhaust fan 3 and the lamp fan 4 according to the embodiment of the invention will be described herein and no description will be made on the other fans.

The mode switch 13 allows a user to choose either a normal mode or an AV mute mode and input the chosen mode. The mode switch 13 outputs the chosen mode described above in the form of a mode signal to the fan controller 7. The mode switch 13 is so disposed, for example, on an outer surface of the enclosure 6 that the user readily operates the switch.

In the normal mode, the light modulator 55 displays an image thereon and the image is normally displayed, for example, on a screen. In the AV mute mode, the light modulator 55 displays no image thereon and no image is displayed, for example, on the screen. In the AV mute mode, the amount of electric power supplied to the lamp 511 is so reduced that the luminance of the lamp 511 is lowered. In the AV mute mode, in which the light modulator 55 displays a plain black image, lowering the luminance of the lamp 511 lowers the illuminance of the light with which the light modulator 55 is irradiated, whereby the reliability of the light modulator 55 is improved. For example, when the user makes a presentation of prepared data in a conference, the user uses the normal mode to make the presentation while looking at a displayed image on the screen, whereas the user switches the operation mode to the AV mute mode to temporarily turn off the displayed image and suspend the presentation. The amount of electric power supplied to the lamp 511 in the normal mode is, for example, 200 W, whereas the amount of electric power supplied to the lamp 511 in the AV mute mode ranges, for example, from about 60 to 70 W.

A description will be made of a procedure for controlling the exhaust fan 3.

Figure 3:
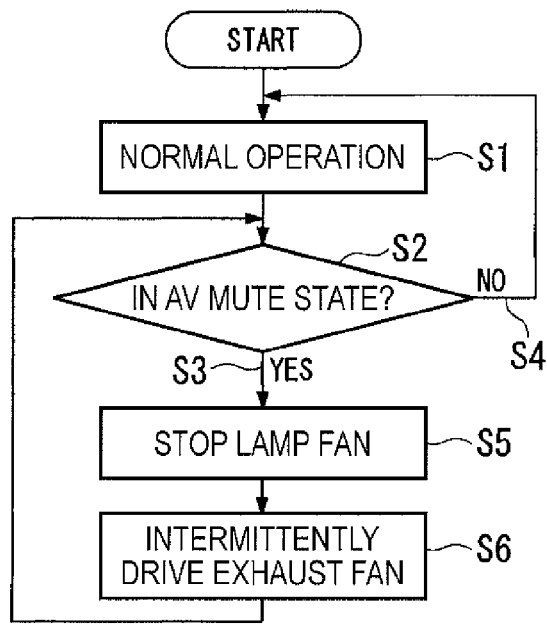
FIG. 3 is a flowchart showing a fan control procedure in the present embodiment.

It is assumed that the exhaust fan 3 is first operated in the normal mode (step S1 in FIG. 3), as shown in FIG. 3.

The fan controller 7 then receives a mode signal from the mode switch 13 and judges whether or not the operation mode has been switched from the normal mode to the AV mute mode (step S2 in FIG. 3). When no AV mute mode signal has been inputted (step S4 in FIG. 3), the operation continues in the normal mode.

When an AV mute mode signal has been inputted (step S3 in FIG. 3), the fan controller 7 outputs a lamp fan control signal to the lamp fan driver 15 to stop the lamp fan 4 (step S5 in FIG. 3).

The fan controller 7 then outputs an exhaust fan control signal to the exhaust fan driver 14 to intermittently drive the exhaust fan 3 (step S6 in FIG. 3).

As long as the operation mode is maintained in the AV mute mode, the operation in steps S5 and SG described above continues. When the operation mode is switched to the normal mode, the operation is switched to the normal operation.

That is, when the lamp 511 emits light of luminance lower than the luminance corresponding to the normal image display, the fan controller 7 intermittently operates the exhaust fan 3. The situation in which "the lamp 511 emits light of luminance lower than the luminance corresponding to the normal image display" corresponds to a low electric power mode in which the electric power supplied to the lamp 511 is lower than the electric power supplied in the normal image display. Further, in the present embodiment, the situation in which the lamp 511 emits light of luminance lower than the luminance corresponding to the normal image display (low electric power mode) corresponds to the AV mute mode, in which the light modulator 55 displays no image thereon.

The present inventor actually measured the temperature of each portion of the projector 1 according to the present embodiment to verify the advantageous effect provided by the projector 1.

Figure 4A:
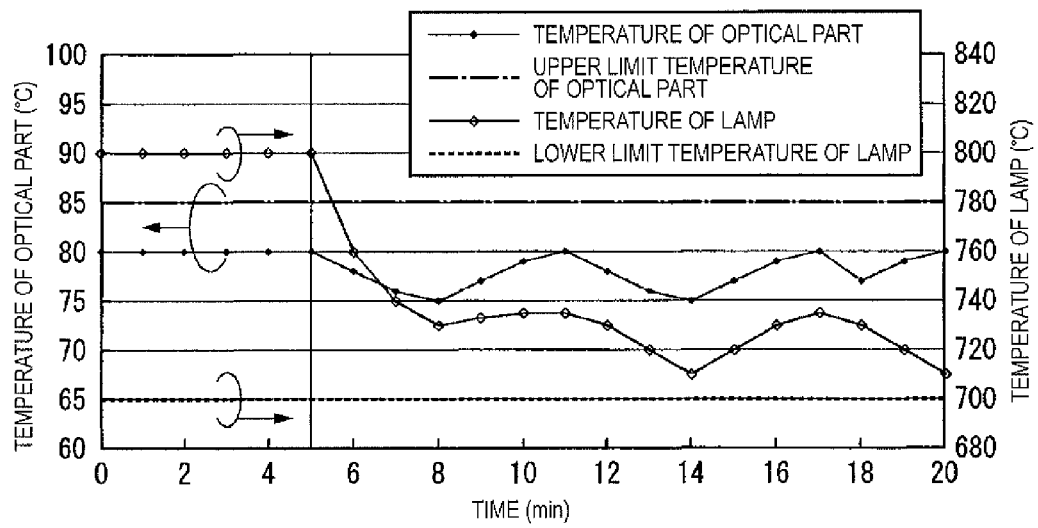
FIG. 4A is a time chart showing a change in the temperatures of a lamp and an optical part in the present embodiment.

FIG. 4A shows an exemplary time chart showing a change in the temperatures of the lamp 511 and an optical part in the projector 1 according to the present embodiment. In FIG. 4A, the horizontal axis represents time (minute), the right-side vertical axis represents the temperature (° C.) of the lamp 511, and the left-side vertical axis represents the temperature (° C.) of the optical part. The optical part in the description refers to an optical part having the lowest heat resistance (acceptable temperature in use) among a large number of optical parts in the enclosure 6. Examples of the optical part include an organic polarizer and a part made of a resin that forms the enclosure 6.

It is assumed in the present example that a lower limit temperature of the lamp 511 is 700° C., and that an upper limit temperature of the optical part is 85° C.

Figure 4B:
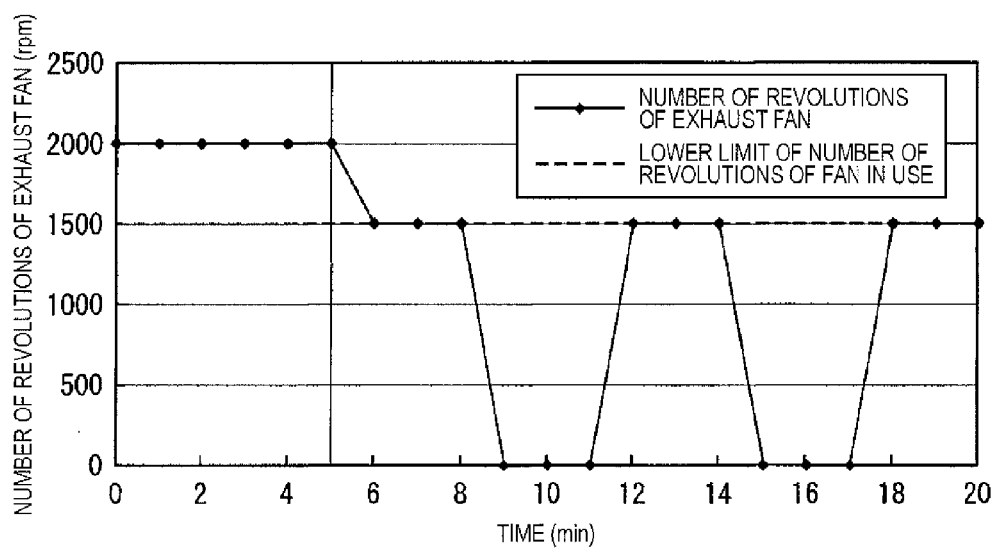
FIG. 4B is a time chart showing a change in the number of revolutions of an exhaust fan in the present embodiment.

FIG. 4B shows an exemplary time chart showing a change in the number of revolutions of the exhaust fan 3. In FIG. 4B, the horizontal axis represents time (minute), and the vertical axis represents the number of revolutions (rpm (revolution/minute)) of the exhaust fan 3. It is assumed in the present example that the lower limit of the number of revolutions of the exhaust fan 3 in use is 1500 rpm.

In the present embodiment, the fan controller 7 operates the exhaust fan 3 intermittently based on a preset switching program according to which the operation of the exhaust fan 3 is switched (start rotating/stop rotating). The switching program is created based on the pattern shown in FIG. 4B. In the present embodiment, in which the projector 1 includes the temperature sensor 5, no temperature detection result from the temperature sensor 5 is therefore used in the control of the exhaust fan 3.

According to the example shown in FIG. 4B, in the normal mode, the normal operation is performed with the number of revolutions of the exhaust fan 3 set at 2000 rpm. It is assumed that the operation mode is switched to the AV mute mode five minutes after reference time (zero minutes). At this point, the number of revolutions of the exhaust fan 3 is linearly lowered to 1500 rpm in one minute, and the exhaust fan 3 running at 1500 rpm is operated for two minutes. That is, in the present embodiment, the maximum number of revolutions of the exhaust fan 3 in the AV mute mode is lower than the number of revolutions of the exhaust fan 3 in the normal mode. The number of revolutions of the exhaust fan 3 is then linearly lowered to 0 rpm in one minute, and the exhaust fan is not in operation for two minutes. The number of revolutions of the exhaust fan 3 is then linearly raised to 1500 rpm in one minute, and the exhaust fan 3 running at 1500 rpm is operated again for two minutes. The operation described above is repeated during the AV mute mode.

In this process, the temperature of the lamp 511 repeatedly lowers in response to the activation of the exhaust fan 3 and rises in response to the deactivation of the exhaust fan 3, as shown in FIG. 4A. Similarly, the temperature of the optical part repeatedly lowers in response to the activation of the exhaust fan 3 and rises in response to the deactivation of the exhaust fan 3. It is noted that the switching program according to which the operation of the exhaust fan 3 is switched is so set in advance that the temperature of the lamp 511 does not become lower than 700° C., which is the lower limit temperature, and that the temperature of the optical part does not become higher than 85° C., which is the upper light temperature.

Figure 7A:
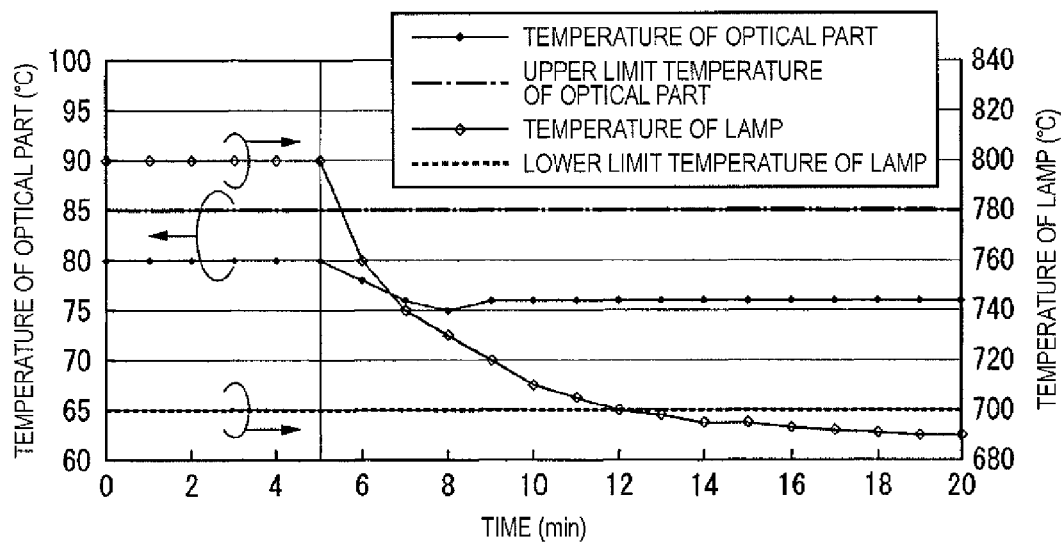
FIG. 7A is a time chart showing a change in the temperatures of a lamp and an optical part in Comparative Example 1.
Figure 7B:
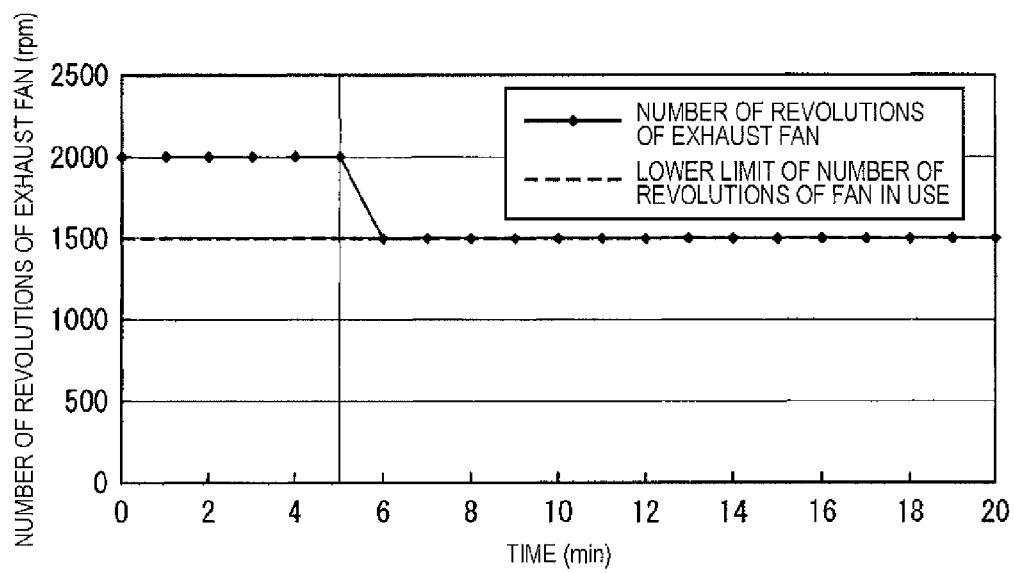
FIG. 7B is a time chart showing a change in the number of revolutions of an exhaust fan in Comparative Example 1.

FIG. 7A is an exemplary time chart showing a change in the temperatures of the lamp and the optical part in a projector according to Comparative Example 1, which will be described below. FIG. 7B shows an exemplary time chart showing a change in the number of revolutions of the exhaust fan in the projector according to Comparative Example 1.

Figure 8A:
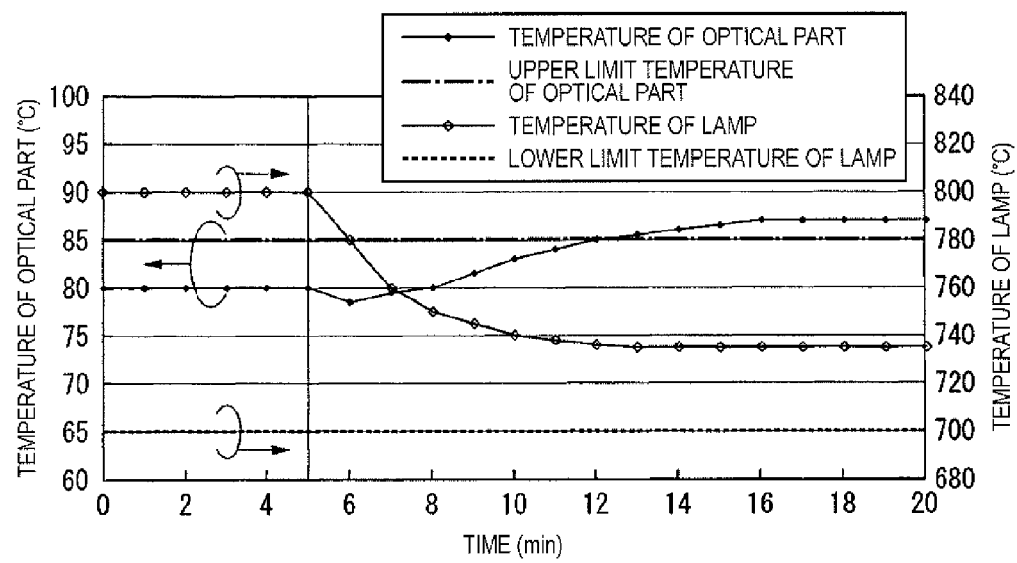
FIG. 8A is a time chart showing a change in the temperatures of a lamp and an optical part in Comparative Example 2.
Figure 8B:
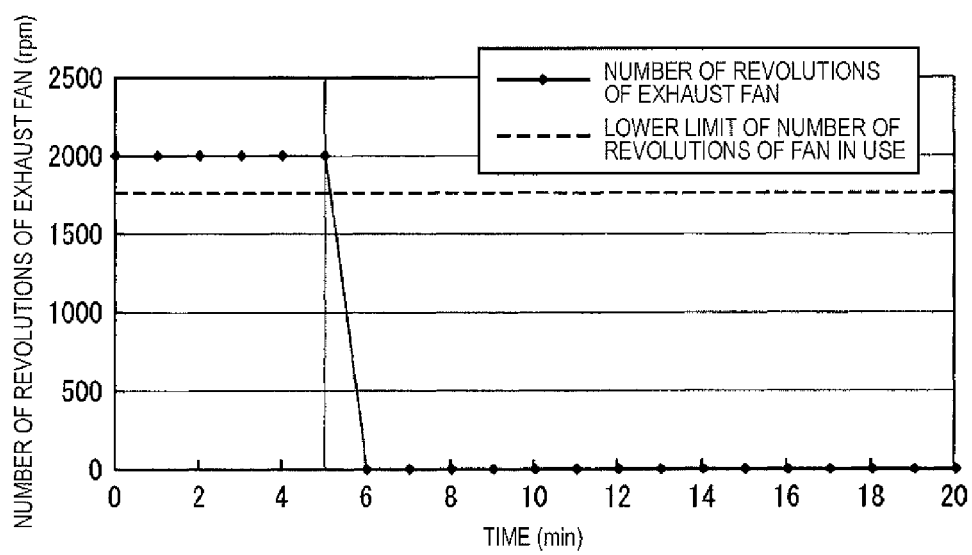
FIG. 8B is a time chart showing a change in the number of revolutions of an exhaust fan in Comparative Example 2.

FIG. 8A is an exemplary time chart showing a change in the temperatures of the lamp and the optical part in a projector according to Comparative Example 2, which will be described below. FIG. 8B is an exemplary time chart showing a change in the number of revolutions of the exhaust fan in the projector according to Comparative Example 2.

In the time charts of FIGS. 7A and 7B and FIGS. 8A and 8B, the horizontal and vertical axes represent the same quantities as those in FIGS. 4A and 4B.

In general, it is difficult to rotate an exhaust fan at a low speed ranging, for example, from 100 to 200 rpm in a stable manner. The lower limit of the number of revolutions of an exhaust fan in use is therefore set, for example, at 1500 rpm. When the operation mode is switched from the normal mode to the AV mute mode, the amount of electric power supplied to the lamp is reduced, in synchronization with which it is conceivable to lower the number of revolutions of the exhaust fan from 2000 rpm to 1500 rpm followed by continuous operation. The projector according to Comparative Example 1 is assumed to operate this way.

In the projector according to Comparative Example 1, although the number of revolutions of the exhaust fan is lowered in the AV mute mode, the exhaust fan still continuously rotates as in the normal mode. Heated air in the enclosure is therefore always exhausted, and the inside of the enclosure is therefore kept cooled. As a result, the lamp was overcooled, and the temperature of the lamp became lower than 700° C., which was the lower limit, for example, 13 minutes later, as shown in FIG. 7A. In this case, vapor in the lamp can condense and the reliability of the lamp is not ensured.

To avoid overcooling of the lamp, it is conceivable to completely stop the exhaust fan (lower the number of revolutions of the exhaust fan to 0 rpm), as shown in FIG. 8B. The projector according to Comparative Example 2 is assumed to operate this way.

In the projector according to Comparative Example 2, since the exhaust fan is not in operation, heated air stays in the enclosure, and the temperature in the enclosure rises. As a result, the temperature of the optical part rose, specifically, the temperature of the optical part became higher than 85° C., which was the upper limit, for example, 13 minutes later, as shown in FIG. 8A. In this case, the performance and reliability of the optical part cannot be ensured.

In contrast, in the projector 1 according to the present embodiment, heated air in the enclosure 6 is adequately exhausted because the exhaust fan 3 is intermittently driven, as shown in FIGS. 4A and 4B. As a result, the temperature of the lamp 511 will not be too low or the temperature of the optical part will not be too high. Both the reliability of the lamp 511 and the performance and reliability of the optical part can therefore be ensured. Further, in the normal mode, operating the lamp fan 4 reliably cools the lamp 511. On the other hand, in the AV mute mode, stopping the lamp fan 4 reliably prevents the lamp 511 from being overcooled. The reliability of the lamp 511 can therefore be improved.

In the present embodiment, when the exhaust fan 3 is intermittently driven in the AV mute mode, the maximum number of revolutions of the exhaust fan 3 is set at 1500 rpm, which is lower than the number of revolutions in the normal mode or 2000 rpm. The method described above is not necessarily employed, and the maximum number of revolutions of the intermittently running exhaust fan 3 may be set at 2000 rpm, which is equal to the number of revolutions in the normal mode. According to the method in the present embodiment, however, the range of the number of revolutions (from 0 to 1500 rpm) is smaller than the range in the case where the intermittent operation is performed by using the maximum number of revolutions in the normal mode. As a result, the temperatures of the lamp 511 and the optical part change moderately, and the frequency of the switching between the activation and deactivation of the exhaust fan can be lowered.

Second Embodiment

A second embodiment of the invention will be described below with reference to FIGS. 5, 6A, and 6B.

The basic configuration of a projector according to the present embodiment is the same as that of the projector according to the first embodiment and differs therefrom only in terms of the method for controlling the exhaust fan.

In the present embodiment, no description will therefore be made of the configuration of each portion of the projector, and only the method for controlling the exhaust fan will be described.

In the first embodiment, the fan controller 7 operates the exhaust fan 3 intermittently based on the switching program according to which the operation of the exhaust fan 3 is switched. In contrast, in the present embodiment, the fan controller 7 operates the exhaust fan 3 intermittently based on a temperature detection result detected with the temperature sensor 5. That is, in the first embodiment, no temperature detection result detected with the temperature sensor 5 is used in the control of the exhaust fan 3, whereas in the present embodiment, a temperature detection result detected with the temperature sensor 5 is used in the control of the exhaust fan 3.

A description will be made of a procedure for controlling the exhaust fan 3.

Figure 5:
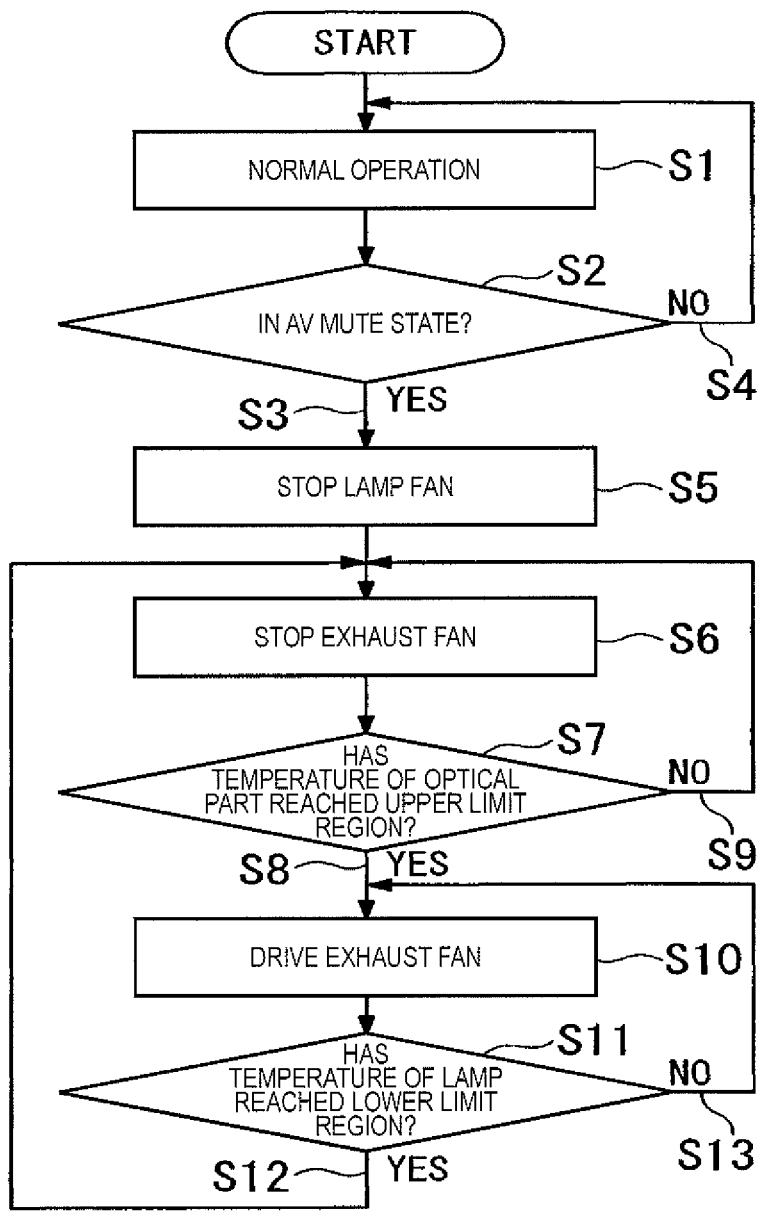
FIG. 5 is a flowchart showing a fan control procedure in a second embodiment.

It is assumed that the exhaust fan 3 is first operated in the normal mode (step S1 in FIG. 5).

The fan controller 7 then receives a mode signal from the mode switch 13 and judges whether or not the operation mode has been switched from the normal mode to the AV mute mode (step S2 in FIG. 5). When no AV mute mode signal has been inputted (step S4 in FIG. 5), the operation continues in the normal mode.

When an AV mute mode signal has been inputted (step S3 in FIG. 5), the fan controller 7 outputs a lamp fan control signal to the lamp fan driver 15 to stop the lamp fan 4 (step S5 in FIG. 5).

The fan controller 7 then outputs an exhaust fan control signal to the exhaust fan driver 14 to temporarily lower the number of revolutions of the exhaust fan 3 to 1500 rpm, operate the exhaust fan 3 running at 1500 rpm for a predetermined period, and then stop the exhaust fan 3 (step S6 in FIG. 5).

The temperature in the enclosure 6 then starts rising because the exhaust fan 3 is brought to stop operating. The fan controller 7 determines the temperature of the optical part based on a temperature detection result from the temperature sensor 5 and judges whether or not the temperature of the optical part has reached an upper limit region of the acceptable temperature range in use (step S7 in FIG. 5). The upper limit region of the acceptable temperature range in use is a region having a range determined in consideration of a predetermined temperature margin with respect to the upper limit temperature. For example, assuming that the upper limit temperature of the optical part is 85° C. and the temperature margin is 2° C., the fan controller 7 judges that the temperature of the optical part falls within the upper limit region of the acceptable temperature range in use when the temperature of the optical part enters a range from 83 to 85° C.

When the temperature of the optical part has reached the upper limit region of the acceptable temperature range in use (step S8 in FIG. 5), the fan controller 7 outputs an exhaust fan control signal to the exhaust fan driver 14 to drive the exhaust fan 3 (step S10 in FIG. 5). On the other hand, when the temperature of the optical part has not reached the upper limit region of the acceptable temperature range in use (step S9 in FIG. 5), the exhaust fan 3 remains not in operation.

When the exhaust fan 3 is driven, the temperature in the enclosure 6 starts lowering. The fan controller 7 determines the temperature of the lamp 511 based on a temperature detection result from the temperature sensor 5 and judges whether or not the temperature of the lamp 511 has reached a lower limit region of the acceptable temperature range in use (step S11 in FIG. 5). The lower limit region of the acceptable temperature range in use is a region having a range determined in consideration of a predetermined temperature margin with respect to the lower limit temperature. For example, assuming that the lower limit temperature of the lamp 511 is 700° C. and the temperature margin is 5° C., the fan controller 7 judges that the temperature of the lamp 511 has reached the lower limit region of the acceptable temperature range in use when the temperature of the lamp 511 has reached a range from 700 to 705° C.

When the temperature of the lamp 511 has reached the lower limit region of the acceptable temperature range in use (step S12 in FIG. 5), the fan controller 7 outputs an exhaust fan control signal to the exhaust fan driver 14 to stop the exhaust fan 3 again (step S6 in FIG. 5). On the other hand, when the temperature of the lamp 511 has not reached the lower limit region of the acceptable temperature range in use (step S13 in FIG. 5), the exhaust fan 3 remains in operation.

As long as the operation mode is maintained in the AV mute mode, the operation in steps S5 to S13 described above continues. When the operation mode is switched to the normal mode, the operation of the exhaust fan 3 and the lamp fan 4 is switched to the normal operation (step S1 in FIG. 5).

The present inventor actually measured the temperature of each portion of the projector 1 according to the present embodiment to verify the advantageous effect provided by the projector 1.

Figure 6A:
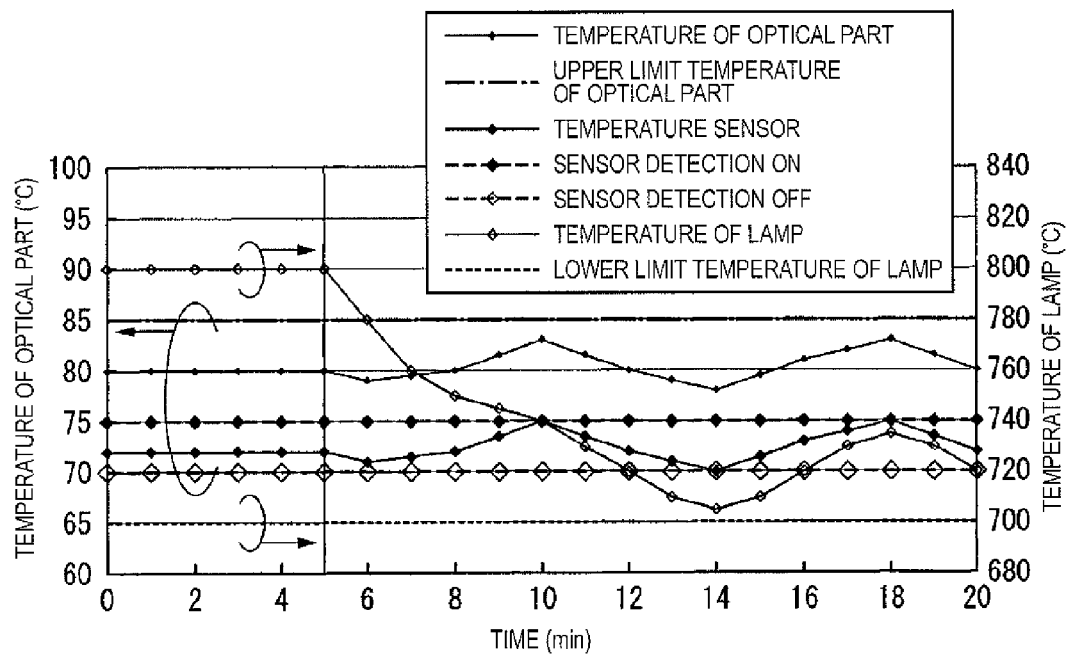
FIG. 6A is a time chart showing a change in the temperatures of a lamp and an optical part in the present embodiment.

FIG. 6A shows an exemplary time chart showing a change in the temperatures of the lamp 511 and the optical part in the projector 1 according to the present embodiment. In FIG. 6A, the horizontal axis represents time (minute), the right-side vertical axis represents the temperature (° C.) of the lamp 511, and the left-side vertical axis represents the temperature (° C.) of the optical part. The optical part is a one having the lowest heat resistance (acceptable temperature in use) among a large number of optical parts in the enclosure, as in the first embodiment.

Figure 6B:
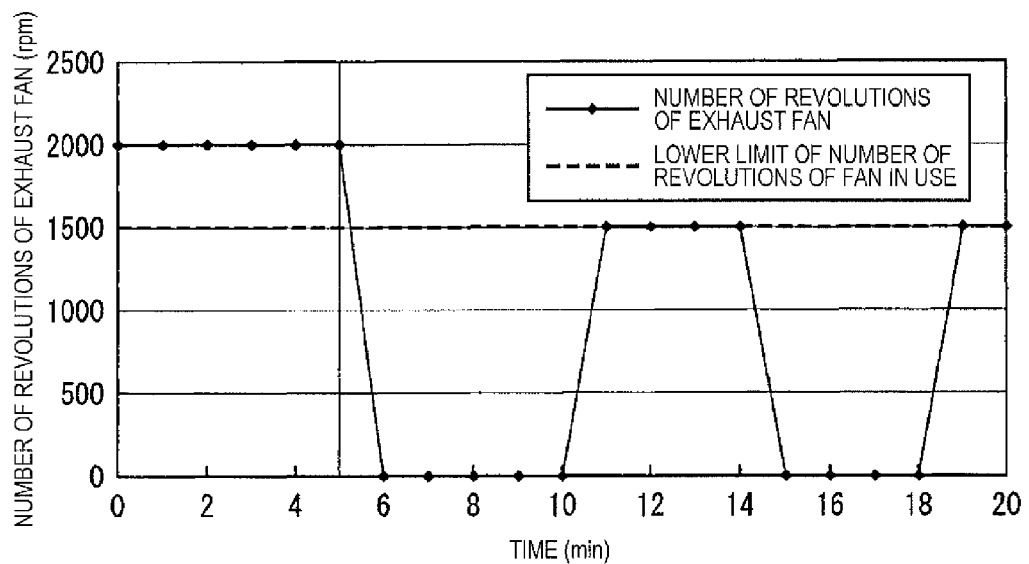
FIG. 6B is a time chart showing a change in the number of revolutions of an exhaust fan in the present embodiment.

FIG. 6B shows an exemplary time chart showing a change in the number of revolutions of the exhaust fan 3. In FIG. 6B, the horizontal axis represents time (minute), and the vertical axis represents the number of revolutions (rpm (revolution/minute)) of the exhaust fan. It is assumed in the present example that the lower limit of the number of revolutions of the exhaust fan 3 in use is 1500 rpm.

According to the example shown in FIGS. 6A and 6B, in the normal mode, the normal operation is performed with the number of revolutions of the exhaust fan 3 set at 2000 rpm. It is assumed that the operation mode is switched to the AV mute mode five minutes after reference time (zero minutes). At this point, the number of revolutions of the exhaust fan 3 is linearly lowered in one minute, and the exhaust fan 3 is brought to stop operating. The temperature of the optical part then starts rising, as shown in FIG. 6A. On the other hand, although the lamp fan 4 and the exhaust fan 3 are brought to stop operating, the electric power supplied to the lamp 511 is reduced, and the temperature of the lamp 511 therefore keeps lowering. The temperature of the optical part rises to about 83° C. at the time of 10 minutes, which means that the temperature of the optical part has reached the upper limit region of the acceptable temperature range in use. The number of revolutions of the exhaust fan 3 is then linearly raised to 1500 rpm in one minute, and the exhaust fan 3 is operated in this state.

Since the exhaust fan 3 starts operating, the temperature of the optical part then starts lowering and exits out of the upper limit region of the acceptable temperature range in use. On the other hand, the temperature of the lamp 511 further lowers not only because the electric power supplied to the lamp 511 is reduced but also because the exhaust fan 3 starts operating. The temperature of the lamp 511 lowers to about 705° C. at the time of 14 minutes, which means that the temperature of the lamp 511 has reached the lower limit region of the acceptable temperature range in use. The number of revolutions of the exhaust fan 3 is then linearly lowered to 0 rpm in one minute, and the exhaust fan 3 is brought to stop operating. The operation described above is repeated during the AV mute mode.

The projector 1 according to the present embodiment, in which the exhaust fan 3 is intermittently driven, can also be a low-power-consumption projector in which both the reliability of the lamp 511 and the performance and reliability of optical parts can be ensured, as in the first embodiment.

In the present embodiment, in particular, since the fan controller 7 derives the temperatures of the lamp 511 and the optical part based on the temperature sensor 5, the exhaust fan 3 can be controlled in a fine-grained, accurate manner. Further, since the single temperature sensor 5 serves as a sensor for detecting the temperature of the lamp 511 and a sensor for detecting the temperature of the optical part, the number of temperature sensors and hence the number of parts can be reduced. It is, however, noted that a sensor for detecting the temperature of the lamp 511 and a sensor for detecting the temperature of the optical part may be separately provided.

The technical range of the invention is not limited to the embodiments described above, and a variety of changes can be made thereto to the extent that they do not depart from the substance of the invention. For example, the configuration of the optical unit in the projector according to each of the embodiments described above can be changed as appropriate. Further, in the embodiments described above, the invention is applied to a three-panel liquid crystal projector, but the projector according to each of the embodiments of the invention is not limited to a three-panel liquid crystal projector. For example, the invention may be applied to a color-sequential single-panel liquid crystal projector. The invention may further be applied to a projector using a digital micromirror (DMD, a registered trademark of Texas Instruments, USA) or any other light modulator different from a liquid crystal light valve.

The entire disclosure of Japanese Patent Application No. 2012-231900, filed Oct. 19, 2012 is expressly incorporated by reference herein.

What is claimed is:

1. A projector comprising:
a light source section that outputs light;
a light modulator that modulates the light outputted from the light source section based on an image signal;
a projection optical section that projects the modulated light from the light modulator;
an enclosure that accommodates the light source section, the light modulator. and the projection optical section:
a first fan that exhausts air in the enclosure out of the enclosure;
a second fan that cools the light source section: and
a fan controller that controls the first fan and the second fan,
wherein the fan controller stops the second fan and operates the first fan intermittently when the light source section outputs light of luminance lower than luminance corresponding to normal image display.

2. The projector according to claim 1,
wherein a situation in which the light source section outputs light of luminance lower than luminance corresponding to the normal image display corresponds to a low electric power mode in which electric power supplied to the light source section is lower than electric power supplied in the normal display.

3. The projector according to claim 1,
wherein the situation in which the light source section outputs light of luminance lower than luminance corresponding to the normal image display corresponds to an operation mode in which the light modulator displays no image thereon.

4. The projector according to claim 1, further comprising:
a first temperature sensor that detects the temperature of the light source section; and
a second temperature sensor that detects the temperature of an optical part inside the enclosure,
wherein when the first fan operates intermittently, the fan controller
activates the first fan when the temperature detected with the second temperature sensor is higher than or equal to an upper limit region of an acceptable temperature range of the optical part, and
deactivates the first fan when the temperature detected with the first temperature sensor is lower than or equal to a lower limit region of an acceptable temperature range of the light source section.

5. The projector according to claim 4,
wherein a single temperature sensor serves as the first temperature sensor and the second temperature sensor.

6. The projector according to claim 1,
wherein the fan controller operates the first fan to rotate and to stop rotating intermittently based on a switching program according to which the operation of the first fan is switched.

7. The projector according to claim 1,
wherein the number of revolutions of the intermittently operated first fan is lower than the number of revolutions of the first fan operated when the normal image display is performed.

8. A method for controlling a projector that projects an image and includes a light source section that outputs light, an enclosure that accommodates the light source section, a first fan that exhausts air in the enclosure out of the enclosure, and a second fan that cools the light source section, the method comprising:
causing the light source section to output light of luminance lower than luminance corresponding to normal display of the image;
deactivating the second fan; and
operating the first fan intermittently.

9. The method for controlling a projector according to claim 8,
wherein when the light source section outputs light of luminance lower than luminance corresponding to the normal image display, electric power lower than electric power supplied in the normal image display is supplied to the light source section.

10. The method for controlling a projector according to claim 8,
wherein the projector further includes a light modulator that modulates the light from the light source section based on an image signal, and
when the light source section outputs light of luminance lower than luminance corresponding to the normal image display, the light modulator displays no image thereon.

11. The method for controlling a projector according to claim 8,
wherein the projector further includes a first temperature sensor that detects the temperature of the light source section and a second temperature sensor that detects the temperature of an optical part inside the enclosure, and
the first fan is activated when the first fan operates intermittently and the temperature detected with the second temperature sensor is higher than or equal to an upper limit region of an acceptable temperature range of the optical part, and the first fan is deactivated when the first fan operates intermittently and the temperature detected with the first temperature sensor is lower than or equal to a lower limit region of an acceptable temperature range of the light source section.

12. The method for controlling a projector according to claim 11,
wherein a single temperature sensor detects the temperature of the light source section and the temperature of the optical part.

13. The method for controlling a projector according to claim 8, further comprising
operating the first fan to rotate and to stop rotating intermittently based on a switching program according to which the operation of the first fan is switched.

14. The method for controlling a projector according to claim 8, further comprising
operating the first fan intermittently at a smaller number of revolutions than the number of revolutions of the first fan operated when the normal image display is performed.

* * * * *